(No Model.)

E. G. NICODEMUS & C. C. GUISINGER.
NUT LOCK.

No. 575,268. Patented Jan. 12, 1897.

WITNESSES:
Edward Thorpe

INVENTORS
E. G. Nicodemus
C. C. Guisinger
BY
ATTORNEYS

UNITED STATES PATENT OFFICE.

ELLSWORTH G. NICODEMUS AND CYRUS C. GUISINGER, OF CANAL WINCHESTER, OHIO.

NUT-LOCK.

SPECIFICATION forming part of Letters Patent No. 575,268, dated January 12, 1897.

Application filed June 9, 1896. Serial No. 594,821. (No model.)

*To all whom it may concern:*

Be it known that we, ELLSWORTH G. NICODEMUS and CYRUS C. GUISINGER, of Canal Winchester, in the county of Franklin and State of Ohio, have invented a new and Improved Nut-Lock, of which the following is a full, clear, and exact description.

The object of the invention is to provide a new and improved nut-lock which is simple and durable in construction and arranged to permit of securing the nut to the proper place and of rendering the lock inactive whenever it is desired to remove the nut.

The invention consists principally of a washer formed with teeth and adapted to fit onto a bolt, a nut adapted to abut on the said washer and screwing on the bolt, a spring-pressed pawl fitted to slide in the said nut and adapted to engage one of the said teeth, and a handle held on the said pawl for manipulating the same and carrying it into an inactive position on the said nut.

The invention also consists of certain parts and details and combinations of the same, as will be fully described hereinafter and then pointed out in the claim.

Reference is to be had to the accompanying drawings, forming a part of this specification, in which similar characters of reference indicate corresponding parts in all the figures.

Figure 1:
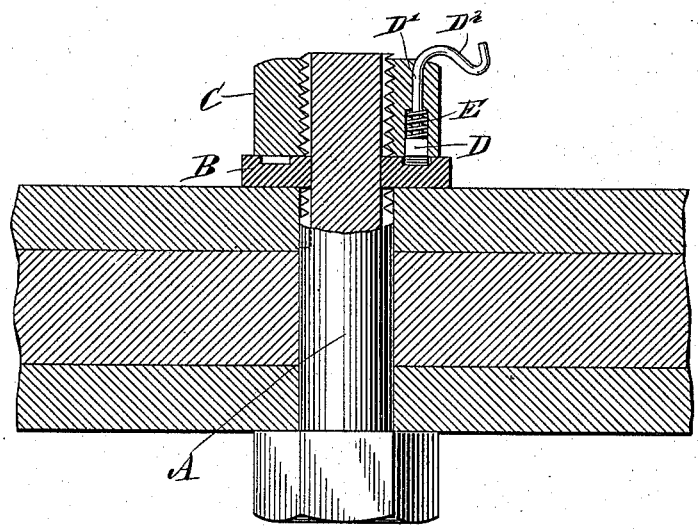
Figure 2:
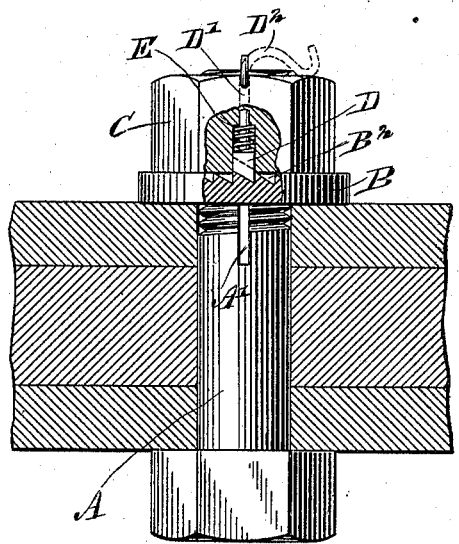
Figure 3:
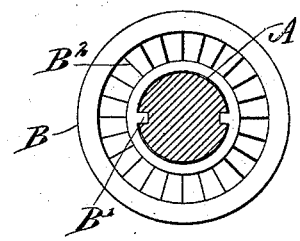
Figure 4:
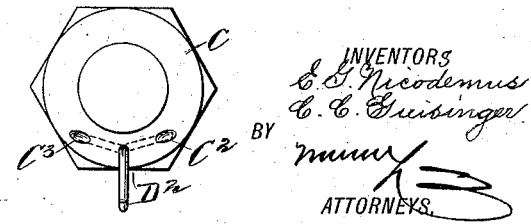

Figure 1 is a cross-section of the improvement as applied. Fig. 2 is a front view of the same with parts in section. Fig. 3 is a plan view of the washer in place on the bolt and the latter in section, and Fig. 4 is a plan view of the nut.

The bolt A is provided in its threaded outer portion with one or more longitudinally-extending grooves A', adapted to be engaged by correspondingly-shaped lugs B', projecting inwardly from a washer B, fitted loosely on the said bolt A.

The washer B is adapted to rest with its inner face against the article to be secured in place, and on the outer face of the said washer is adapted to abut the nut C, screwing in the usual manner on the outer threaded end of the bolt A.

In the face of the washer B, next to the nut C, are arranged ratchet-teeth $B^2$, adapted to be engaged by a pawl D, fitted to slide vertically in a suitable recess formed in the under side of the nut C. The upper face of the nut C is inclined, so that the bent upper end of the rod D may ride up the face, and so that such rod will be lifted during such movement to disengage the pawl D and ratchet B. The pawl D is pressed downward by a spring E, set into the upper end of the recess containing the pawl, the said spring being coiled around a rod D', extending from the pawl D upwardly through a suitable opening in the nut C. On the outer end of this rod D' is formed a handle $D^2$, adapted to be taken hold of by the operator to pull the pawl D out of engagement with the corresponding tooth $B^2$ of the washer B. The handle $D^2$ is to be rotated in such a manner that it travels on the inclined top portion of the nut C, so that when a swinging motion is given to the handle the free end travels up the said rounded portion of the nut to lift the rod D', and consequently the pawl D, to move the latter out of engagement with the ratchet-tooth $B^2$.

The free end of the handle $D^2$ is adapted to pass into one or more notches $C^2$, formed on the top of the nut C, so as to lock the said handle in position at the same time the pawl D is inactive, that is, is withdrawn from the tooth in the washer B. Now when the handle is in this position the nut C can be readily screwed in or out on the bolt A, and when it is desired to lock the nut C in place, after it is properly screwed up into the desired position, then the operator swings the handle $D^2$ outward into the position shown in Figs. 1 and 2 to permit the spring E to force the pawl D into engagement with one of the teeth $B^2$ of the washer B. The nut C is thus securely fastened in position.

Having thus described our invention, we claim as new and desire to secure by Letters Patent—

The combination of a bolt provided with a longitudinal slot through its threaded end, a collar with a tongue projecting into the slot, the collar also having a ratcheted upper face, a nut operating from the threaded end of the bolt and having a passage running through it parallel with the bolt, the nut also having two indentations in its upper face, the upper face being rounded to form a cam-surface, a spring-pressed pawl located within the lower portion of the passage in the nut and coacting with the ratchet of the ring and the rod connected to the pawl passing through the upper portion of the passage, the upper end of the rod being bent out laterally and thence upwardly to form a rounded extremity, the rounded extremity running on the cam-shaped portion of the nut and being capable of fitting within the recess in the upper side of the nut whereby to raise the pawl from engagement with the ring, substantially as described.

ELLSWORTH G. NICODEMUS.
    CYRUS C. GUISINGER.

Witnesses:
 B. M. TEEGARDIN,
 MARIEN M. HARRIS.